US012645588B1

(12) United States Patent
Garrett et al.

(10) Patent No.: US 12,645,588 B1
(45) Date of Patent: Jun. 2, 2026

(54) METHOD OF OPERATION FOR A COMPUTING SYSTEM

(71) Applicant: Fabric of Truth, Inc., Los Altos, CA (US)

(72) Inventors: David Garrett, Los Altos, CA (US); Michael Gao, Los Altos, CA (US); Gilbert Hendry, Los Altos, CA (US)

(73) Assignee: Fabric of Truth, Inc., Los Altos, CA (US)

( * ) Notice: Subject to any disclaimer, the term of this patent is extended or adjusted under 35 U.S.C. 154(b) by 0 days.

(21) Appl. No.: 18/980,075

(22) Filed: Dec. 13, 2024

Related U.S. Application Data

(63) Continuation of application No. 18/777,335, filed on Jul. 18, 2024, now abandoned.

(60) Provisional application No. 63/590,309, filed on Oct. 13, 2023.

(51) Int. Cl.
G06F 12/02 (2006.01)
G06F 17/16 (2006.01)

(52) U.S. Cl.
CPC .......... G06F 12/0292 (2013.01); G06F 17/16 (2013.01); *G06F 2212/251* (2013.01)

(58) Field of Classification Search
CPC . G06F 12/0292; G06F 17/16; G06F 2212/251
See application file for complete search history.

(56) References Cited

U.S. PATENT DOCUMENTS 7,725,641 B2 5/2010 Park et al.
10,218,494 B1 2/2019 De Quehen et al.

11,816,572 B2 11/2023 Bruestle et al.
2002/0029364 A1* 3/2002 Edmonston ....... H03M 13/6362
714/701
2002/0133688 A1* 9/2002 Lee ..................... G06F 15/7867
712/22
2004/0015758 A1* 1/2004 Pathak ................... G11C 29/12
714/725
2011/0296118 A1 12/2011 Carter et al.
(Continued)

OTHER PUBLICATIONS

Atlas, et al., "Multi-Precision Fast Modular Multiplication", Ingonyama Blog, published Jan. 15, 2023.
(Continued)

*Primary Examiner* — Michael Krofcheck
(74) *Attorney, Agent, or Firm* — Jeffrey Schox; Samuel Rosenthal

(57) ABSTRACT

A computing system, preferably including a scratchpad, a plurality of computation units, and a register file, and optionally including a controller. The computing system, or any suitable elements thereof, can optionally be integrated into a processor unit, wherein one or more such processor units can optionally be integrated into a larger-scale computing system. Some or all elements of the larger-scale computing system can be collocated and/or codefined on a single semiconductor chip, can be located and/or defined on separate chips, and/or can be otherwise located and/or defined. A method of operation, preferably including performing computation unit I/O operations and/or performing scratchpad I/O operations. The method of operation is preferably performed using the computing system, but can additionally or alternatively be performed using any other suitable systems.

10 Claims, 10 Drawing Sheets

(56) References Cited

U.S. PATENT DOCUMENTS

| | | |
|---|---|---|
| 2014/0053000 A1 | 2/2014 | Yap et al. |
| 2019/0073196 A1 | 3/2019 | Hiscock |
| 2019/0227981 A1 | 7/2019 | Tomishima et al. |
| 2020/0004506 A1 | 1/2020 | Langhammer et al. |
| 2022/0180187 A1* | 6/2022 | Kim ..................... G06N 3/0464 |
| 2023/0134216 A1 | 5/2023 | Anderson |

OTHER PUBLICATIONS

Banakar, et al., "Scratchpad Memory : A Design Alternative for Cache On-chip memory in Embedded Systems", Proceedings of the Tenth International Symposium on Hardware/Software Codesign. CODES 2002 (IEEE Cat. No. 02TH8627), Estes Park, CO, USA, 2002, pp. 73-78, doi: 10.1145/774789.774805.
Barrett, Paul, "Implementing the Rivest Shamir and Adleman Public Key Encryption Algorithm on a Standard Digital Signal Processor", Advances in Cryptology—CRYPTO '86, Santa Barbara, California, USA, 1986, Proceedings, vol. 263 of Lecture Notes in Computer Science, pp. 311-323. Springer, 1986.
Domb, Yuval, "Fast Modular Multiplication", Ingonyama blog, published Jul. 25, 2022.
Gao, et al., "Method and System for Barrett Reduction Computation", U.S. Appl. No. 18/825,710, filed Sep. 5, 2024.
Langhammer, et al., "Efficient FPGA Modular Multiplication Implementation", FPGA '21, Session 3: Machine Learning and Supporting Algorithms, 2021 (Year: 2021).

* cited by examiner scratchpad selected vector

VLD $vdr0, 0x8 = {mem[X*8], ...,  mem[0x8]} load from scratchpad
(e.g., to register file)

Word-length 64 bits: $vdr0, 0x008, 0x0, 0x0, 0xFFFFFF
$vdr0 = { mem[0x0C0], mem[0x0B8], ..., mem[0x008] }

Word-length 256 bits: $vdr0, 0x0E8, 0x0, 0x0, 0x3F
$vdr0 = { mem[0x198], mem[0x190], ..., mem[0x0E0] }

Word-length 384 bits: $vdr0, 0x01B0, 0x0, 0x0, 0x3F
$vdr0 = { mem[0x2C8], mem[0x2C0], ..., mem[0x1B0] }

METHOD OF OPERATION FOR A COMPUTING SYSTEM

CROSS-REFERENCE TO RELATED APPLICATIONS

This application is a continuation of U.S. patent application Ser. No. 18/777,335, filed on 18 Jul. 2024, which claims the benefit of U.S. Provisional Application Ser. No. 63/590, 309, filed on 13 Oct. 2023, each of which is incorporated in its entirety by this reference.

TECHNICAL FIELD

This invention relates generally to the computing field, and more specifically to a new and useful computing system and method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figures 1A, 2:
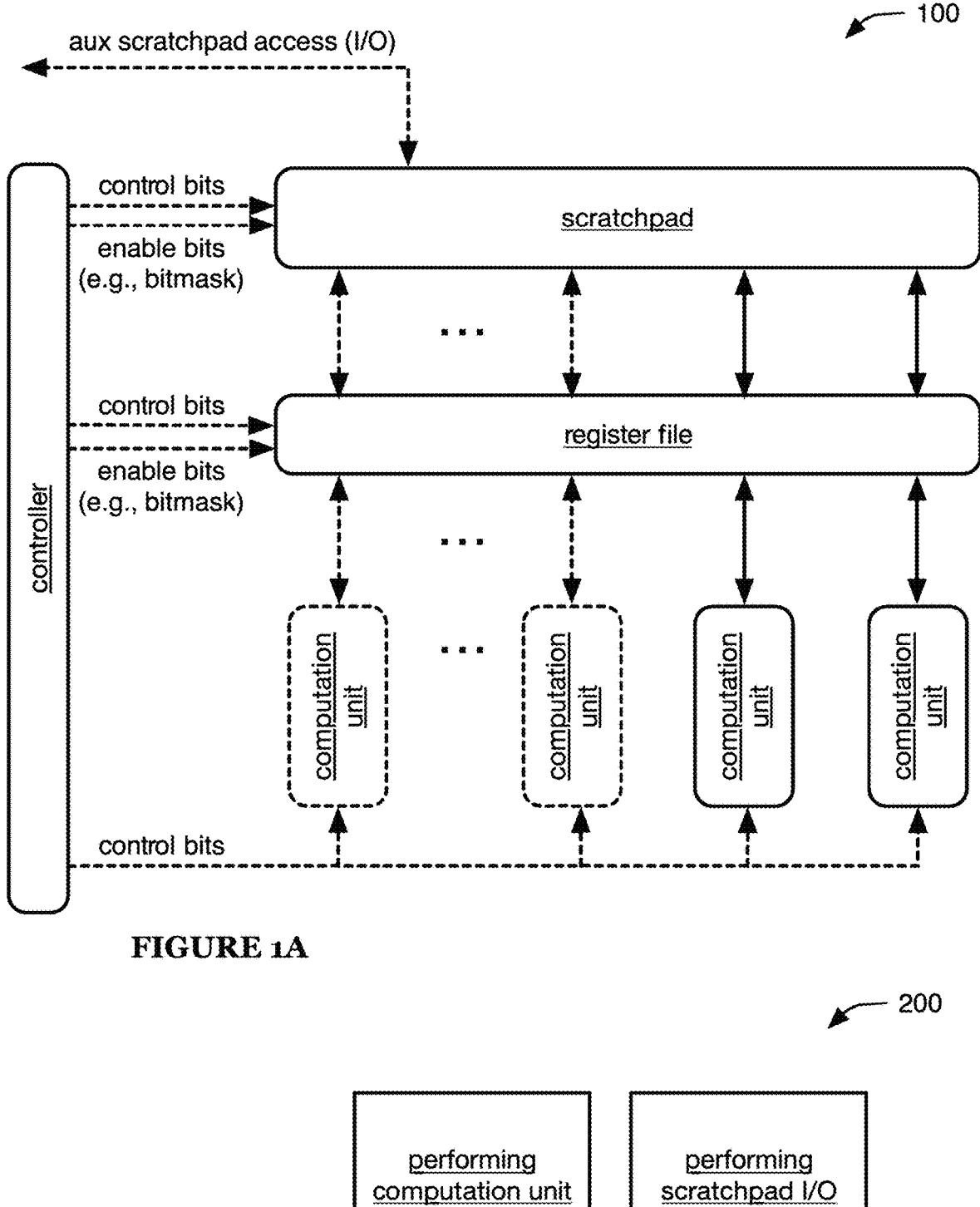
FIGS. 1A-1B are schematic representations of an embodiment of a computing system and an example of the embodiment, respectively.
FIG. 2 is a schematic representation of an embodiment of a method of operation.
Figure 1B:
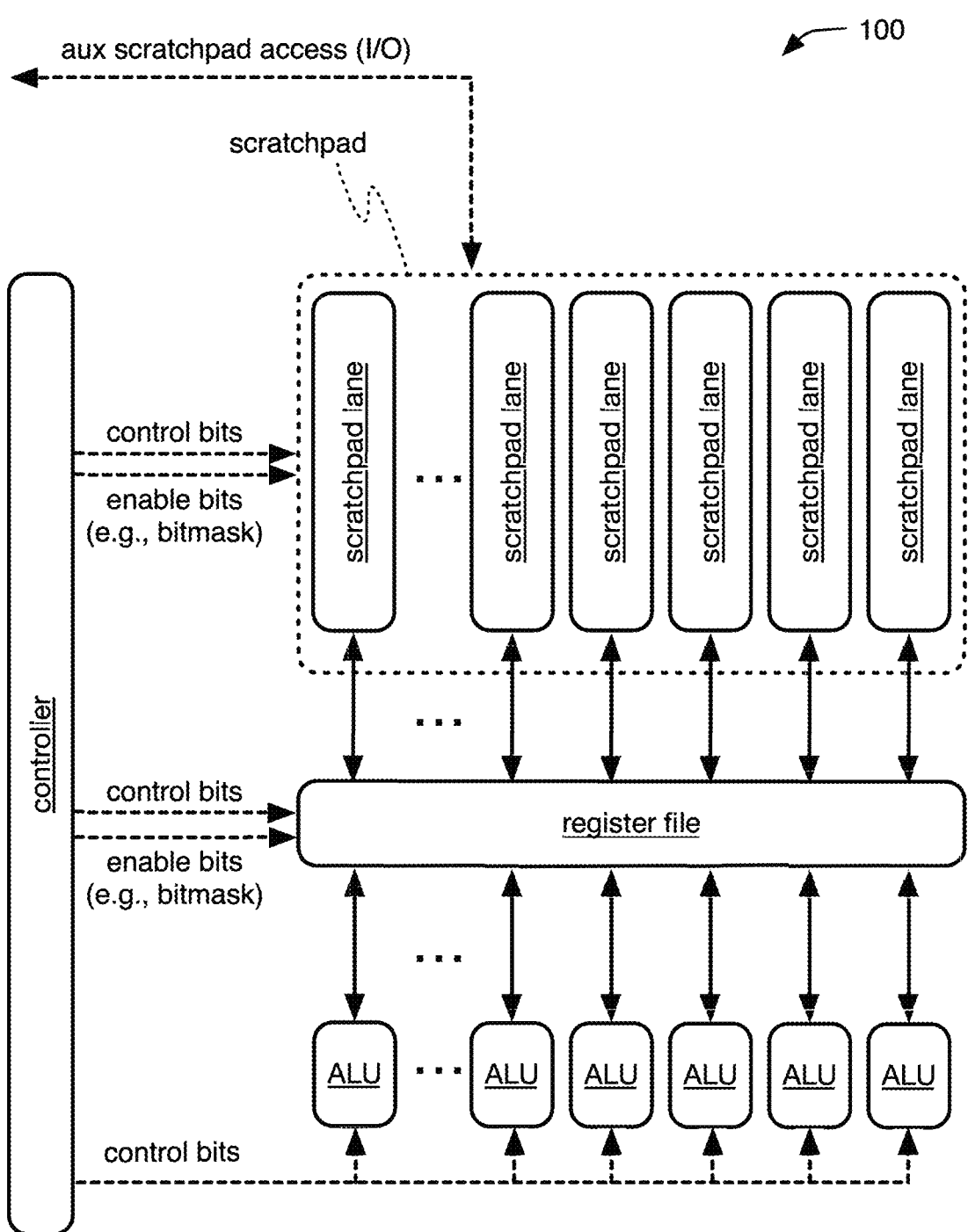

A computing system 100 preferably includes a scratchpad, a plurality of computation units, and a register file, and can optionally include a controller (e.g., as shown in FIGS. 1A-1B). The computing system can additionally or alternatively include any other suitable elements. The computing system 100 is preferably configured to perform the method of operation described herein, but can additionally or alternatively be configured to perform any other suitable methods.

In some embodiments, the scratchpad, computation units, and register file (e.g., along with any other suitable elements) are integrated into a processor unit (e.g., as an integrated circuit defined on a chip), wherein one or more such processor units can be integrated (e.g., along with any other suitable elements, such as memory, networking, controllers, etc.) into a larger-scale (e.g., multi-processor) computing system. For example, the larger-scale computing system (e.g., "computing assembly") can include a plurality of computing systems such as described herein (e.g., wherein each such computing system is identical to all others of the assembly, wherein some or all computing systems of the assembly differ from one another, etc.), control modules (e.g., general-purpose computing systems, computing systems including one or more RISC-V processors, etc.), memory (e.g., DRAM modules), and/or any other suitable elements, preferably wherein all such elements are communicatively connected to each other (e.g., by a mesh network, such as a mesh network-on-chip, by any other suitable network, etc.). Some or all elements of the larger-scale computing system can be collocated and/or codefined on a single semiconductor chip, can be located and/or defined on separate chips, and/or can be otherwise located and/or defined. However, the elements described herein can additionally or alternatively be arranged and/or integrated in any other suitable manner.

A method of operation 200 preferably includes performing computation unit I/O operations and/or performing scratchpad I/O operations (e.g., as shown in FIG. 2). The method is preferably performed using the computing system described herein, but can additionally or alternatively be performed using any other suitable systems.

2. System.

The scratchpad preferably functions to store data for the computing system, more preferably storing data on-chip, which can enable low-latency input and/or output operations (I/O). The scratchpad preferably includes a scratchpad memory that includes a plurality of storage elements (e.g., static random access memory (SRAM) elements). The scratchpad memory preferably defines a plurality of memory columns, more preferably wherein these memory columns partition the scratchpad memory (e.g., each storage element of the scratchpad memory belongs to exactly one memory column). The scratchpad is preferably configured into independently-addressable scratchpad lanes (e.g., wherein each memory column defines an independently-addressable lane). For example, the scratchpad can include 24 parallel 64-bit lanes, each associated with a separate SRAM instance (e.g., wherein each such SRAM instance holds 2048 entries of 64 bits each).

Further, the scratchpad memory preferably defines a plurality of memory rows (e.g., orthogonal to the memory columns), more preferably wherein these memory rows partition the scratchpad memory (e.g., each storage element of the scratchpad memory belongs to exactly one memory row); in an example in which each SRAM instance holds R entries (e.g., indexed from 0 to R-1), the scratchpad preferably defines R memory rows (e.g., analogously indexed from 0 to R-1), wherein the ith memory row preferably includes the ith entry of each SRAM instance of the scratchpad (for all integers i where $0 \leq i < R$).

However, the scratchpad can additionally or alternatively include any other suitable elements in any suitable arrangement.

The system preferably includes a plurality of computation units. The computation units preferably function to perform computations (e.g., combinational logic operations). In examples, the computation units can be (and/or include): arithmetic units, logic units, arithmetic logic units (ALUs) operable to perform arithmetic and bitwise operations on integer binary values, floating point units (e.g., operable to perform operations on floating point binary values), and/or any other suitable computation units. The computation units are preferably configured into lanes, more preferably configured into lanes matching the scratchpad lanes. For example, the computing system can include one computation unit (e.g., ALU) for each scratchpad memory column, wherein the computation units and scratchpad memory columns support the same bit width. In a specific example, the computing system includes 24 distinct 64-bit ALUs, corresponding to 24 distinct 64-bit scratchpad lanes.

However, the system can additionally or alternatively include any other suitable computation units in any suitable arrangement.

The register file preferably functions to provide low-latency storage for one or more computation units, and can additionally or alternatively function as an interface between the computation units and the scratchpad (e.g., supporting multiple access operations in parallel, such as supporting two read operations and two write operations concurrently). The register file preferably includes at least one register for each scratchpad lane (e.g., wherein the registers and the scratchpad lanes have the same bit width, such as a bit width of b, wherein b is preferably a power of 2, such as 64 bits, but can alternatively have one or more prime factors greater than 2). For example, the register file can include memory (e.g., SRAM, latches, etc.) equivalent in size to the total width of a single row of the scratchpad (across all scratchpad lanes) or, alternatively, equivalent in size to multiple such rows (e.g., 32 rows). In a specific example, in which the scratchpad includes 24 lanes of 64-bit width, the register file can include 24 distinct 64-bit registers, equal to a total of 192 bytes (or can alternately include multiple rows of registers, each of that size). The register file preferably has a smaller capacity than the scratchpad (but can alternatively have the same capacity as the scratchpad or greater capacity than the scratchpad). For example, the register file may include only one or a few memory rows (e.g., parallel addressable rows), whereas the scratchpad may include many more memory rows (e.g., each memory row of the scratchpad having the same memory capacity as each row of the register file). In a specific example, the register file includes 256 memory rows, and the scratchpad includes 2048 memory rows.

The register file is preferably communicatively connected (e.g., by one or more communication links, preferably bidirectional communication links) to each computation unit and to each scratchpad lane (e.g., enabling I/O operations with each computation unit and each scratchpad lane). The computing system preferably supports at least concurrently performing one access operation (e.g., read or write operation) on each scratchpad lane (in some examples, concurrently performing one read operation and one write operation on each scratchpad lane), and concurrently performing at least two read operations and one or two write operations for each computation unit (e.g., all within a single processor cycle). In some examples, the register file is operable to enable (e.g., at each lane of the register file) concurrently reading both a value indicative of a memory location (e.g., memory location within the scratchpad, such as a location for an access operation) and a data value (e.g., data for the access operation, such as data to be written to the memory location), which can enable execution of a memory access operation on each lane between the scratchpad and the register every single cycle. However, the computing system can additionally or alternatively support any other suitable degree of communication concurrency.

The computing system preferably includes a memory rotation datapath (e.g., barrel shifter) between the register file and the scratchpad, which can function to enable realignment of vectors (and/or any other suitable data) transferred between the scratchpad and register file. Optionally, the computing system can include an any-to-any datapath between the register file and scratchpad, thereby enabling arbitrary reorganization of data transferred between the register file and scratchpad (wherein a person of skill in the art will recognize that an any-to-any datapath can be configured to act as a memory rotation datapath). The computing system preferably includes a one-to-one datapath between the register file and the computation units (e.g., wherein each computation unit can perform I/O with a single lane of the register file). Alternatively (e.g., in embodiments in which the scratchpad-to-register file datapath is one-to-one, rather than including a memory rotation datapath), the computing system can include a memory rotation datapath between the register file and the computation units, can include an any-to-any datapath between the register file and the computation units (e.g., enabling each computation unit to access arbitrary registers), and/or can include any other suitable datapaths.

However, the computing system can additionally or alternatively include any other suitable register file having any other suitable functionality and/or arrangement.

The computing system optionally includes a controller, which can function to control operation of any or all other elements (e.g., scratchpad, register file, computation units, etc.) of the computing system. For example, the controller can be operable to provide control signals (e.g., as control bits) to the scratchpad, the register file, and/or the computation units, and/or to provide enable signals (e.g., as enable bits) to the scratchpad and/or the register file. The control signals can function to provide instructions to the elements that receive them (e.g., provide instructions to perform access operations, such as read and/or write operations, at particular memory elements of the scratchpad and/or register file, such as wherein the control signal itself is indicative of the memory location and/or wherein the control signal is indicative of a location storing the memory location; provide instructions to perform particular computations at one or more of the computation units, etc.). In one example, a control signal can be indicative of an access operation to be performed, including both a read location for each lane and a write location for each lane (e.g., wherein the signal itself encodes the read and/or write location, wherein the signal is indicative of one or more memory locations from which the read and/or write locations can be read, wherein the read and/or write locations are available at a standardized memory location such as a specific register of the register file, etc.). The enable signals can function to indicate which memory elements (e.g., of a memory row or column, of an entire memory store such as the scratchpad memory or the register file, etc.) should be energized, write enabled, and/or otherwise enabled (e.g., wherein an enable signal can be or include one or more bitmasks indicative of which memory elements to enable). In some examples, in which different memory elements should be operated on in different manners, operating the system can include performing a first operation using a first set of enable signals, and performing a second operation using a second, complementary set of enable signals (e.g., performing the first operation using a first bitmask, and performing the second operation using a second, complementary bitmask, wherein the second bitmask is the bitwise inverse of the first bitmask). For example, if a set of memory elements (e.g., a vector of memory elements) is partitioned into a first set of elements (e.g., "base case" elements) to be handled in a first manner and a second set of elements (e.g., "edge case" elements) to be handled in a second manner, the first set can be handled with a first operation while using a first bitmask to exclude the second set, and the second set can be handled with a second operation while using the inverse bitmask (e.g., generated by inverting the first bitmask) to exclude the first set.

In one example, the controller is operable to: receive (or otherwise determine) one or more addresses in memory (e.g., byte addresses corresponding to memory locations within one or more elements of the computing system), determine a memory location (e.g., memory row and memory column) corresponding to a memory address (e.g., making this determination: for each address received, such as separately and/or independently for each address received, jointly for some or all addresses, etc.; for only a subset of addresses received; for any other suitable addresses; etc.), generating one or more signals (e.g., control signals, such as control bits, and/or enable signals, such as enable bits) based on (e.g., indicative of) the determined memory location (or, in examples in which determinations are made for multiple memory addresses, optionally indicative of a plurality of memory locations), and/or providing the generated signal(s) to the appropriate computing system elements (e.g., to the element(s) containing the indicated memory location(s)).

However, the controller can additionally or alternatively have any other suitable functionality and/or be configured in any other suitable manner.

The system preferably includes a plurality of communication links (e.g., data links). The communication links preferably function to communicatively connect the register file to the computation units and the scratchpad lanes. These links can include electrical connections, optical connections, and/or any other suitable connections operable to enable communication (e.g., data communication) between their endpoints. Each communication link is preferably bidirectional (e.g., a single electrical connection configured for use in either direction; multiple electrical connections, wherein some or all are dedicated for use in a specific direction, preferably wherein at least one is dedicated for use in a first direction and another is dedicated for use in the reverse direction; etc.). However, the communication links can additionally or alternatively include unidirectional links and/or any other suitable links.

In some examples, the scratchpad defines a plurality of memory lanes (e.g., k memory lanes, wherein k may have one or more prime factors greater than 2, such as having a prime factor of 3, but alternatively wherein k is a power of 2) that partition the scratchpad memory, each memory lane preferably having a bit width b; the register file includes one or more rows, each row defining a width equal to the total memory width of the scratchpad (e.g., equal to kb), such as wherein the register file includes k registers (or nk registers for a positive integer n) of b bits each; and/or the system includes k computation units, each operable to operate on b bit values. In such examples, the system preferably includes k data links (e.g., having a capacity of b bits or greater) communicatively coupling the scratchpad to the register file, wherein each such data link is preferably coupled to a different memory lane of the scratchpad. In some such examples, these k data links couple the scratchpad to the memory rotation datapath, wherein the system can include an additional k data links (e.g., having a capacity of b bits or greater) communicatively coupling the memory rotation datapath to the register file (e.g., wherein each such data link is coupled to a different register or register column of the register file). Additionally or alternatively, the system can include an additional k data links (e.g., having a capacity of b bits or greater) communicatively coupling the computation units to the register file, preferably wherein each such data link is coupled from a different register or register column of the register file to a different computation unit (e.g., computation unit corresponding to the register or register column, such as aligned within a communication lane with the register or register column).

The computing system can additionally or alternatively include one or more communication links between elements of the computing system (and/or between one or more such elements and elements outside the computing system, such as elements of a larger-scale computing system), preferably wherein each such link has a capacity of b bits or greater (or, for links configured to handle concurrent communication for a plurality of lanes, the product of b and the number of lanes to be handled concurrently). For example, the computing system can include one or more communication links that bypass the register file in communicatively coupling the scratchpad to the computation units, such as directly connecting the scratchpad to each computation unit (e.g., directly connecting each computation unit to a different lane of the scratchpad, connecting the computation units to the scratchpad via a memory rotation datapath and/or any-to-any datapath, etc.).

Additionally or alternatively, the computing system can include one or more communication links that communicatively couple the controller to one or more other elements of the computing system (e.g., to the scratchpad, register file, and/or computation units). In some examples, these controller communication links may differ from the other communication links of the system. In some such examples, these controller communication links may be unilateral (e.g., configured only to enable communication from the controller to the other elements, but not from the other elements to the controller). Additionally or alternatively, in some such examples, these controller communication links may have different capacity (e.g., lower capacity) than the other communication links of the system. However, these controller communication links can additionally or alternatively have any other suitable characteristics.

Additionally or alternatively, the computing system can include one or more communication links operable to provide auxiliary access to the scratchpad, register file, computation units, and/or controller (e.g., providing direct access to any or all of these computing system elements), such as providing such access to one or more elements outside the computing system (e.g., providing access via a network, such as a network-on-chip; providing access directly to one or more memory resources, control modules, other computing systems, and/or the like; etc.); for example, such auxiliary access links can be connected to each lane of the element(s) in question, and/or to any suitable subset thereof.

However, the system can additionally or alternatively include any other suitable communication links.

Figure 3A:
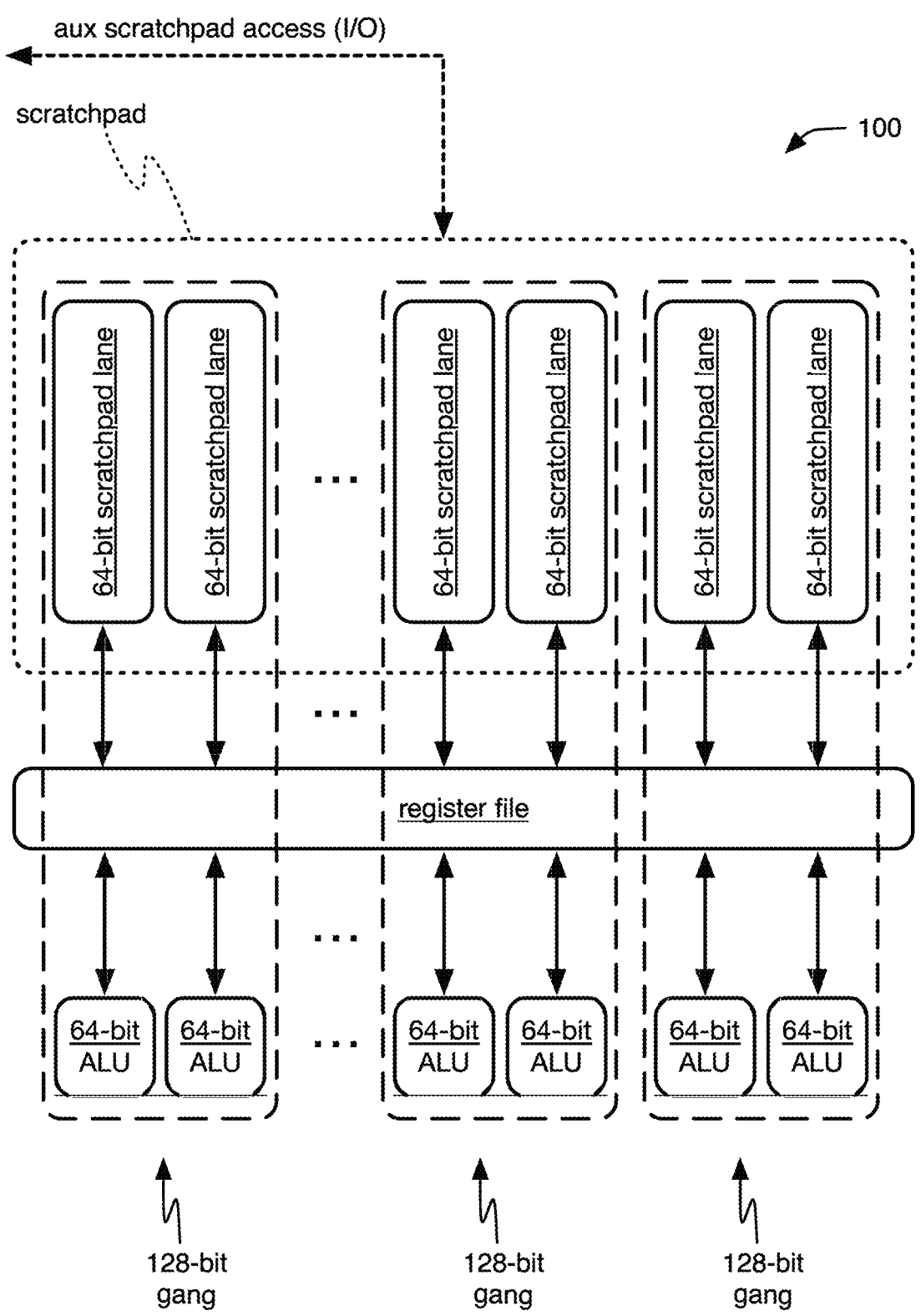
FIGS. 3A-3B are schematic representations of a first and second example, respectively, of ganged modes in the computing system.
Figure 3B:
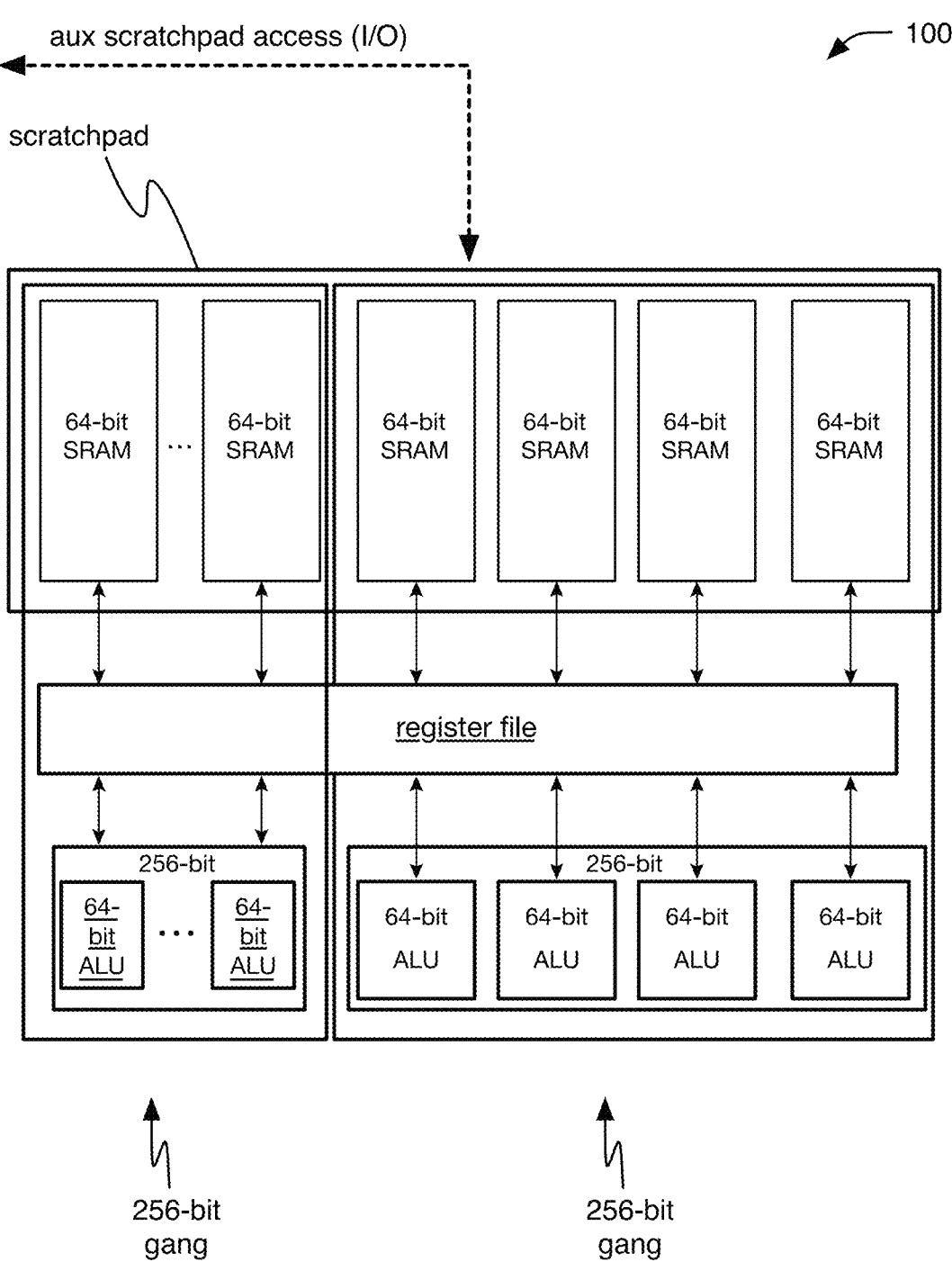

The computing system is preferably configurable between multiple modes, each corresponding to a different integer size (e.g., to a different word length, wherein, in any such mode, an integer is the size of one word). In one such mode (e.g., a "base" mode), the integer size (e.g., "base" integer size) can be equal to the size that the system's registers, lanes, and/or computation units are configured to handle individually (e.g., 64 bits), denoted above in some examples as b, whereas in other such modes (e.g., larger integer modes), the integer size can be equal to a multiple of that value (e.g., achieved by ganging together multiple lanes and/or computation units). In larger integer modes (e.g., including an integer size equal to a multiple of the base integer size), the lanes and computation units are preferably ganged together into equally-sized gangs that collectively span all lanes of the computing system. Accordingly, the total number of lanes will be divisible by the number of gangs and/or by the number of lanes in any given gang. For example, a computing system including 24 total lanes (e.g., of 64 bits each) can support modes with gangs of 1, 2, 3, 4, 6, 8, 12, and/or 24 lanes (e.g., corresponding to integer sizes of 64, 128, 192, 256, 384, 512, 768, and/or 1536 bits). Preferably, all scratchpad lanes, computation units, and register file columns are ganged together in equivalent manners (e.g., wherein the gangs of the register file columns are aligned with the gangs of scratchpad lanes and the gangs of computation units), such as shown by way of example in FIGS. 3A-3B. In some examples, the total number of lanes (and/or the base integer size) may not be a power of 2, and accordingly will have one or more prime factors greater than 2 (e.g., wherein the total number of lanes and/or the base integer size is an integer multiple of 3, such as being equal to the product of 3 and a power of 2); accordingly, in all modes supported by the system of such examples, either the integer size or the number of gangs (or alternatively, both) will not be a power of 2 (e.g., if the total number of lanes is equal to the product of 3 and a power of 2, and the base integer size is a power of 2, then either the larger integer size or the corresponding number of gangs will be an integer multiple of 3, meaning that 3 is a prime factor of then either the larger integer size or the corresponding number of gangs). In a specific example, in which the base integer size is b=64 bits and the computing system includes 24 total lanes of 64 bits each, the system is configurable between the base mode (corresponding to 24 lanes, each supporting an integer size of 64 bits) and several larger integer modes, which can include a 256-bit mode (corresponding to 6 gangs of 4 lanes each), a 384-bit mode (corresponding to 4 gangs of 6 lanes each), and optionally one or more additional modes (e.g., a 128-bit mode corresponding to 12 gangs of 2 lanes each, a 512-bit mode corresponding to 3 gangs of 8 lanes each, a 768-bit mode corresponding to 2 gangs of 12 lanes each, etc.). However, the computing system can additionally or alternatively be configurable in any other suitable modes, and/or such mode configuration can additionally or alternatively be achieved in any other suitable manner.

The computing system (or any suitable subset, such as the elements described herein) is preferably defined on a single chip (e.g., as part of a single integrated circuit, such as a VLSI integrated circuit). The computing system is preferably operable to enable I/O with additional (on- and/or off-chip) memory resources (e.g., processor caches such as on-chip, SRAM, and/or DRAM, additional memory such as SRAM and/or DRAM, preferably including GDDR SDRAM, etc.), (on- and/or off-chip) computing resources (e.g., other computing systems, such as in examples in which the computing system is integrated into a larger-scale computing system or other computing assembly, such as described above in more detail), networking resources, and/or any other suitable resources. In some such examples, the computation units (and/or the scratchpad) can be connected to a computing system memory architecture (e.g., including one or more tiers of on- and/or off-chip memory), such as via one or more processor caches.

However, the computing system can additionally or alternatively include any other suitable elements in any suitable arrangement.

3. Method.

The method preferably includes performing computation unit I/O operations and/or performing scratchpad I/O operations. The computation unit and scratchpad unit I/O operations are preferably performed concurrently (or substantially concurrently), but can additionally or alternatively be performed with any other suitable timing.

The method preferably includes operating in one or more modes, each such mode associated with a different integer size (and/or word length, preferably wherein, in any given mode, an integer is the size of one word). For example, the method can include operating in one or more such modes, wherein each mode corresponds to an integer size (and/or word length) supported by the computing system (e.g., as described above in more detail, such as described above regarding the multiple modes between which the computing system is configurable). In a specific example, the method can include operating in one or more of the following modes: a 64-bit mode (e.g., in which each 64-bit memory lane is independent), a 256-bit mode (e.g., in which the 64-bit memory lanes are grouped into gangs of four), and/or a 384-bit mode (e.g., in which the 64-bit memory lanes are grouped into gangs of six). However, the method can additionally or alternatively include operating in any other suitable mode(s).

Performing computation unit I/O operations preferably functions to transfer data between the computation units and the register file. In some examples, this can include at each computation unit (in ganged operation, each gang of computation units), or for any suitable subset of such computation units, reading from and/or writing to the register file. This is preferably achieved in a single processor cycle, but can additionally or alternatively be achieved with any other suitable timing. When the system is configured for ganged operation, such I/O operations are preferably performed by each gang of computation units (rather than being performed independently by individual computation units), wherein each such read and/or write operation is performed contiguously across a gang of computation units and the corresponding gang of registered file columns. However, the method can additionally or alternatively include performing any other suitable computation unit I/O operations in any suitable manner.

Performing scratchpad I/O operations preferably functions to transfer data between the scratchpad and the register file. Performing scratchpad I/O operations can include operating the scratchpad in an independent addressing mode and/or operating the scratchpad in a vectorized addressing mode.

Figure 4A:
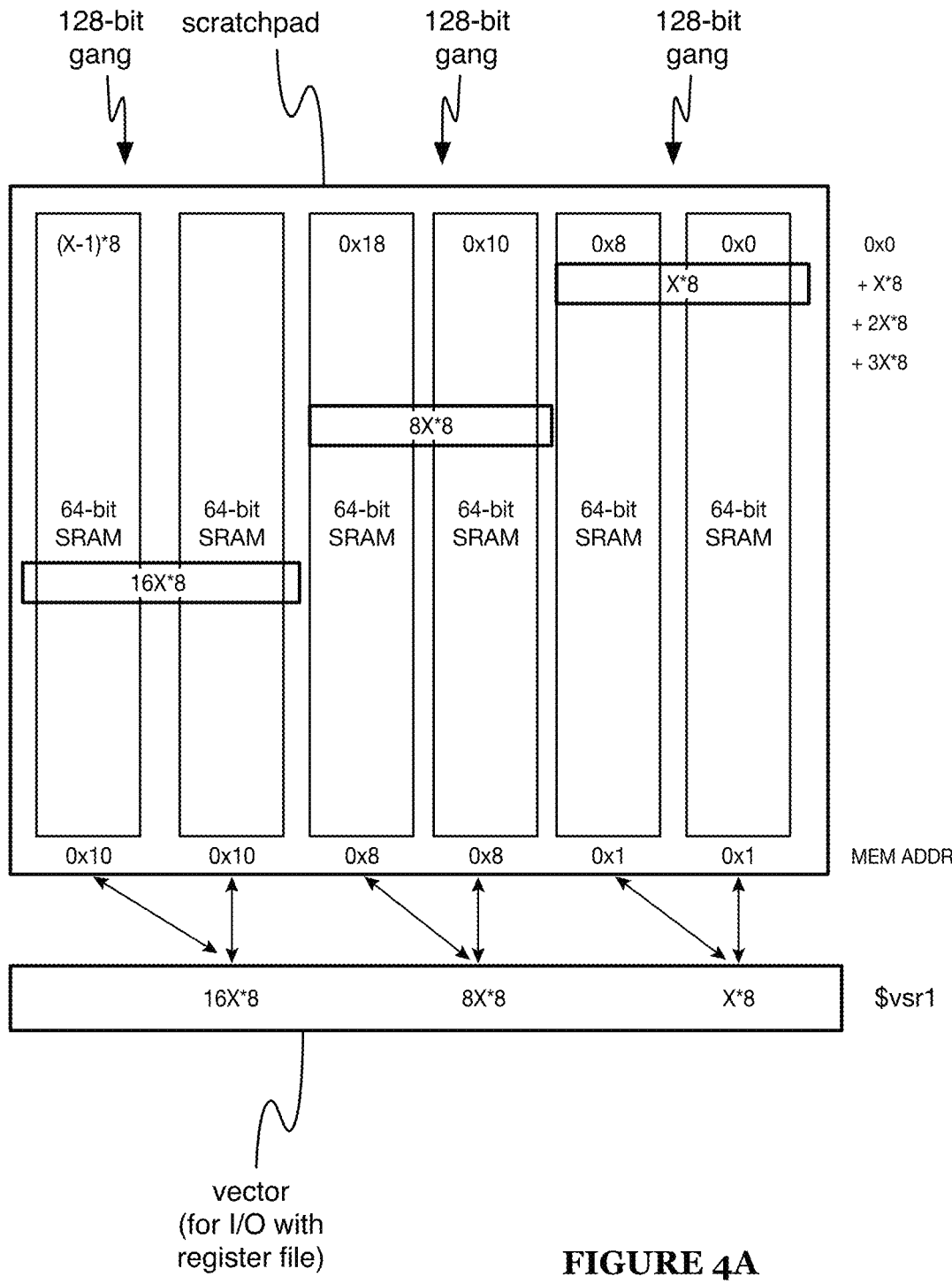
FIGS. 4A-4B are schematic representations of a first and second specific example, respectively, of independent addressing.
Figure 4B:
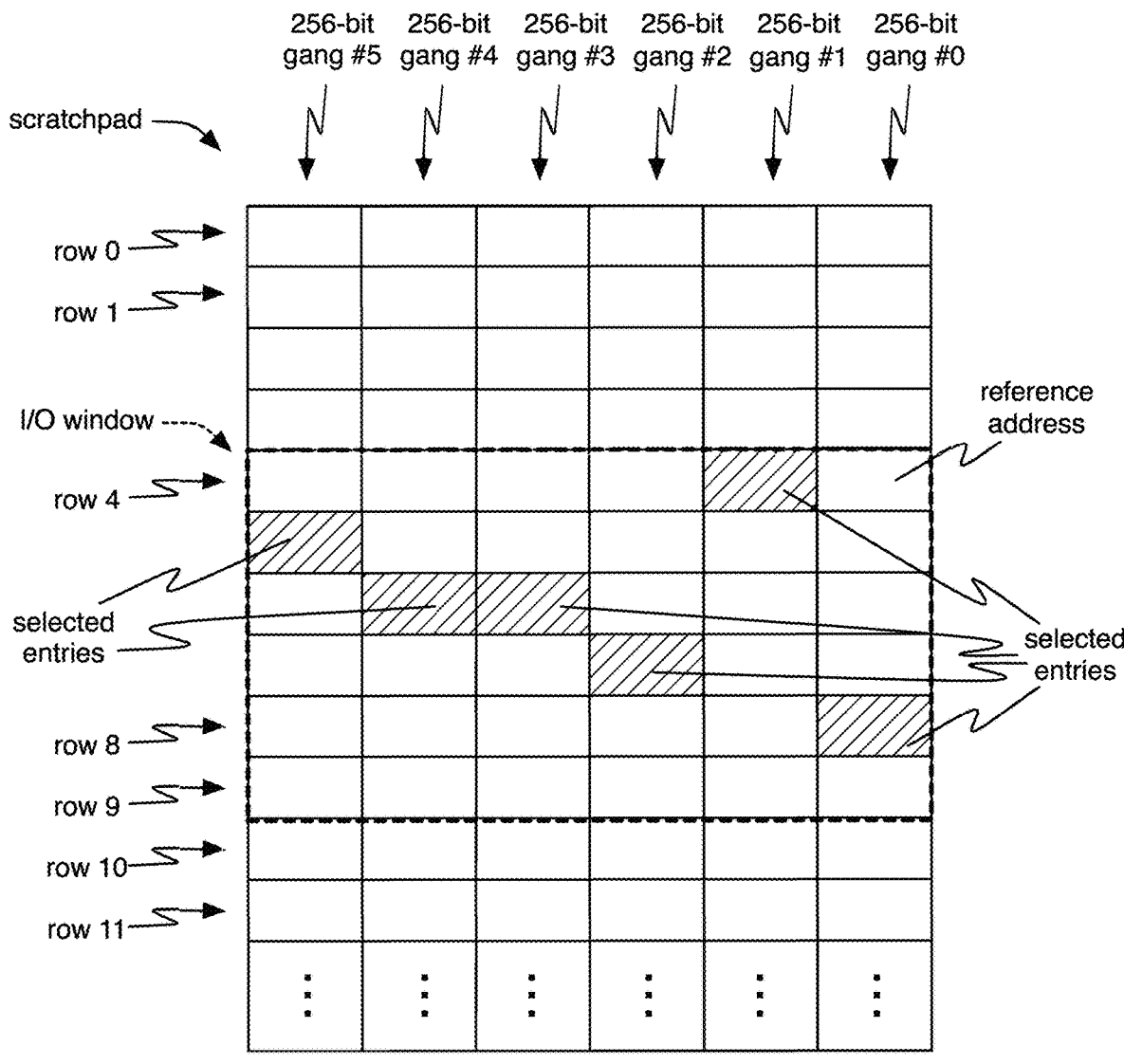

Operating the scratchpad in the independent addressing mode preferably functions to transfer arbitrary data (e.g., to and/or from substantially arbitrary scratchpad locations) between the scratchpad and the register file. In examples, the independent addressing mode can be employed to facilitate Number Theoretic Transform (NTT) access patterns, vectorized multi-scalar multiplication (MSM) bucketing, and/or any other operations associated with any suitable algorithmic functions. FIGS. 4A-4B depict specific examples of selecting memory addresses within the scratchpad while operating in the independent addressing mode.

For each scratchpad lane (or, in ganged operation, gang of scratchpad lanes), or for any suitable subset thereof, operating in the independent addressing mode can include reading from and/or writing to an arbitrary address within that lane (e.g., within the corresponding memory column). This is preferably achieved in a single processor cycle, but can additionally or alternatively be achieved with any other suitable timing.

In some examples, operating in the independent addressing mode can optionally include using the memory rotate datapath (and/or any-to-any datapath) to shift alignment of register file columns relative to scratchpad lanes (and/or reconfigure data element arrangements in any other suitable manner).

In some examples, operating in the independent addressing mode is performed based on a read and/or write instruction specifying a scratchpad address for each lane (or, in ganged operation, for each gang of lanes). This instruction can optionally include a datapath rotation index (and/or any other suitable datapath configuration information).

In some examples, the scratchpad addresses (e.g., specified as bit or byte addresses, specified by column and/or row indices, etc.) are specified relative to a fixed starting point (e.g., initial entry of the scratchpad, predetermined reference address within the scratchpad such as a hardcoded reference address, etc.). Alternatively, the scratchpad addresses can be specified relative to an arbitrary reference point (e.g., reference point specified within the instructions, reference point configured separately from the instruction such as prior to receipt of the instruction, etc.), such as an arbitrary entry or row (e.g., initial entry of an arbitrary row) within the scratchpad; this reference point is preferably shared for all lanes, but can alternatively be specified on a lane-by-lane (or gang-by-gang) basis or can differ between lanes in any other suitable manner.

In one example, operating in the independent addressing mode can include receiving an individual addressing load instruction ("VLD_VR") that specifies: one or more destinations to write data into (e.g., "$vdro", a pointer to a vector register specifying the destination(s) in memory), such as a single vector destination for the all lanes of the present instruction or a separate scalar destination for each lane or gang to be read from; the set of locations within the scratchpad to read from, such as a vector of row indices, each corresponding to a different lane or gang of the scratchpad (e.g., "$vsro", a pointer to a vector register specifying the source row index within the scratchpad for each lane or gang, wherein the row index is typically provided relative to a configurable reference point); one or more values used to specify a reference point within the scratchpad (e.g., "$scalar_addr", a pointer to a scalar register specifying a first address offset value, preferably in bytes, and/or "addr_offset", an immediate value specifying a second address offset value, preferably in bytes, wherein, in some specific examples, the reference address is specified as the sum of $scalar_addr and addr_offset); and/or a value used to indicate which lanes (or gangs of lanes) are to be used for the present instruction (e.g., "$scalar_mask", a pointer to a scalar register specifying a bitmask indicating which lanes are to be used). In a specific example, a base address ("base_addr", corresponding to the address of the initial entry of the row that contains the reference address specified by the instruction) can be calculated as base_addr= [($scalar_addr+addr_offset)/VLEN_BYTES ] *VLEN_BYTES, (wherein [x] represents the floor of x) and/or a column offset ("column_offset", corresponding to the address offset to reach the reference address from the base address, which can, in some examples, be used to specify a barrel shift) can be calculated as column_offset= (($scalar_addr+addr_offset)/LEN_BYTES) mod M, where VLEN_BYTES is equal to the total number of bytes in a row of the scratchpad and M is equal to the number of gangs (based on the current integer size mode, which can be determined as M=VLEN_BYTES/LEN_BYTES, where LEN_BYTES is the integer size in the current mode). In this specific example, performing the instruction includes, for each gang of the M gangs of lanes (indexed as 0≤i<M), retrieving the value of the source corresponding to gang i, located at scratchpad address base_addr+$vsr0 [i]*VLEN_BYTES+(i+column_offset)*LEN_BYTES, and writing that value to the destination corresponding to gang i ("$vdro[i]"); if the bitmask value(s) corresponding to gang i are zero, then destination corresponding to gang i is preferably not written to, and the scratchpad value of the source corresponding to gang i is optionally not read.

Additionally or alternatively, operating in the independent addressing mode can include receiving an individual addressing store instruction ("VST_VR") that specifies: one or more sources to read data from (e.g., "$vsto", a pointer to a vector register specifying the source(s) in memory), such as a single vector source for the all lanes of the present instruction or a separate scalar source for each lane or gang to be written to; the set of locations within the scratchpad to write to, such as a vector of row indices, each corresponding to a different lane or gang of the scratchpad (e.g., "$vdro", a pointer to a vector register specifying the destination row index within the scratchpad for each lane or gang, wherein the row index is typically provided relative to a configurable reference point); one or more values used to specify a reference point within the scratchpad (e.g., as described above regarding the individual addressing load instruction); and/or a value used to indicate which lanes (or gangs of lanes) are to be used for the present instruction (e.g., as described above regarding the individual addressing load instruction). In a specific example, performing the individual addressing store instruction can be performed in a manner analogous to the specific example of the individual addressing load instruction described above, such a calculating a base address and/or column offset and, for each gang, retrieving the value of the source corresponding to the gang and writing that value to the scratchpad destination address located at scratchpad address base_addr+$vdr0 [i]*VLEN_BYTES+ (i+column_offset)*LEN_BYTES, where i is the index of the gang; if the bitmask value(s) corresponding to a gang are zero, then destination corresponding to that gang is preferably not written to, and the value of the source corresponding to that gang is optionally not read.

In a specific example (e.g., as shown in FIG. 4B), the scratchpad includes 24 separate 64-bit lanes. In this specific example, while operating the system in a 256-bit mode, an independent addressing instruction (e.g., store or load instruction) is received. The instruction specifies a reference point of 0x0300 (e.g., $scalar_addr=0x0300 and addr_offset=0, so base_addr=[0x0300/192]*192=0x0300), for which column_offset=(0x0300/32) mod 6=24 mod 6=0, and for which [0x0300/192]=4 (and so the reference point 0x0300 is located at row 4, lane 0). Further, the instruction specifies the row indices (relative to the reference point) for the six gangs are {4,0,3,2,2,1}, corresponding to the row indices for gang number 0, 1, 2, 3, 4, & 5, respectively. Accordingly, after adding the reference point row index to the row indices specified for each gang, the selected entries are: row 8 from gang 0 (lanes 0-3), row 4 from gang 1 (lanes 4-7), row 7 from gang 2 (lanes 8-11), row 6 from gangs 3 & 4 (lanes 12-19) and row 5 from gang 5 (lanes 20-23).

However, the independent addressing mode can additionally or alternatively be operated in any other suitable manner.

Operating the scratchpad in the vectorized addressing mode preferably functions to transfer vector data (e.g., equal in size to an entire row of the scratchpad and/or register file) between the scratchpad and the register file. In some embodiments, the vector location in the scratchpad may not be restricted to lie within a single row of the scratchpad.

Figure 5A:
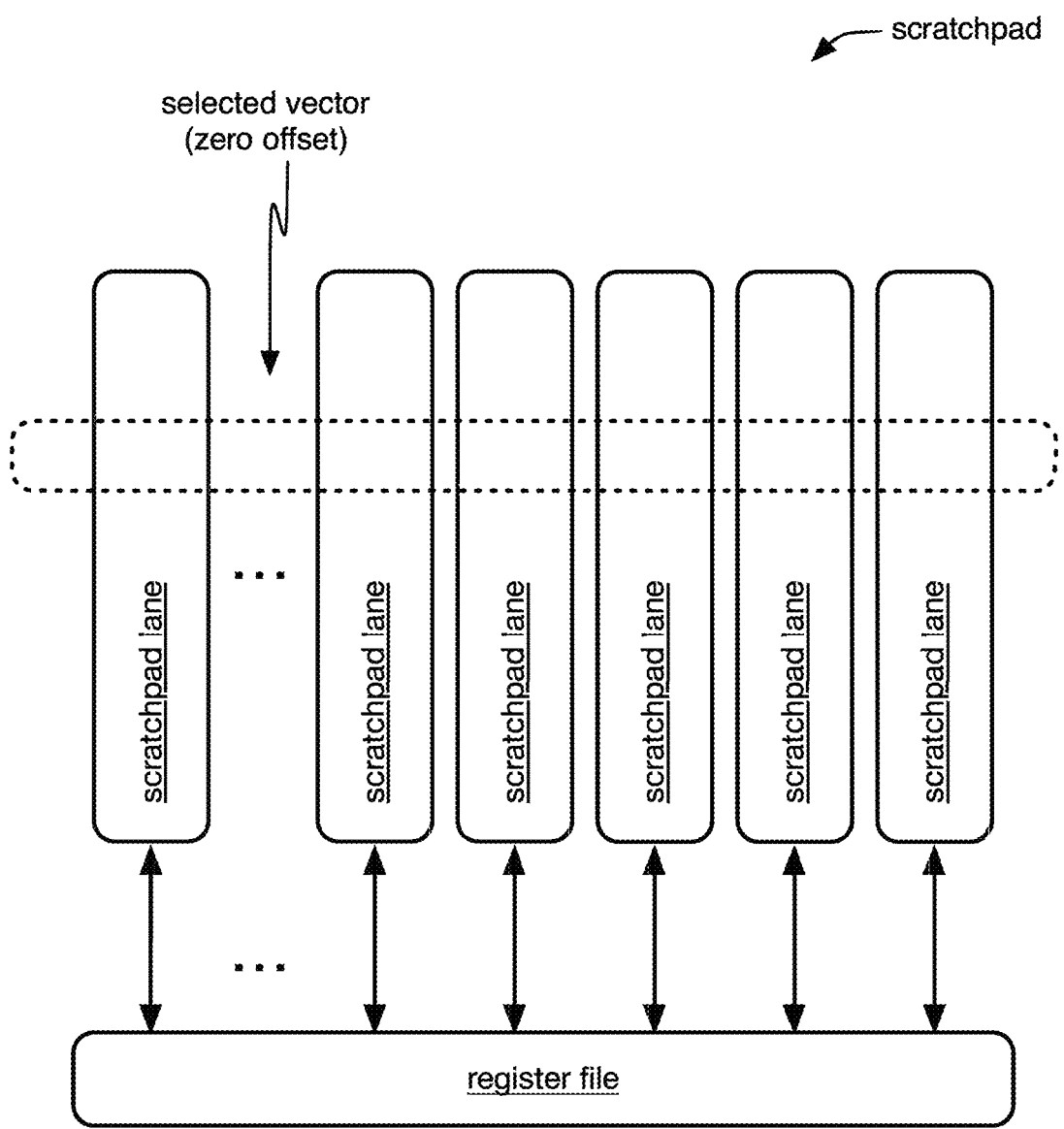
FIGS. 5A-5C are schematic representations of a first, second, and third example, respectively, of vectorized addressing.

In a first example, in which the vector start address has zero offset from the start of a scratchpad row, the entire scratchpad row is read to and/or written from the register file (e.g., by addressing each scratchpad lane separately to read and/or write the relevant portion of the vector), such as shown by way of example in FIG. 5A.

Figure 5B:
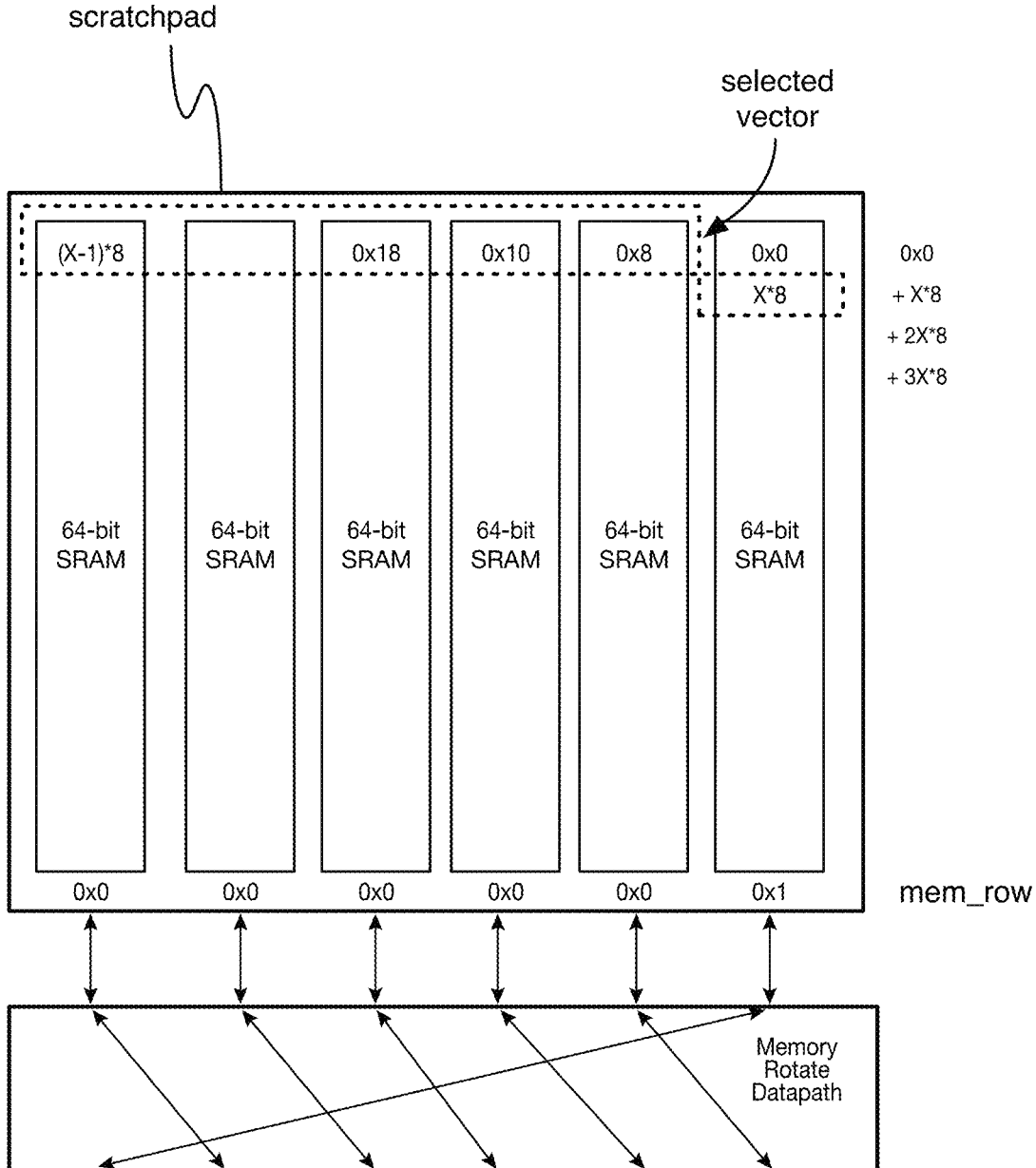
Figure 5C:
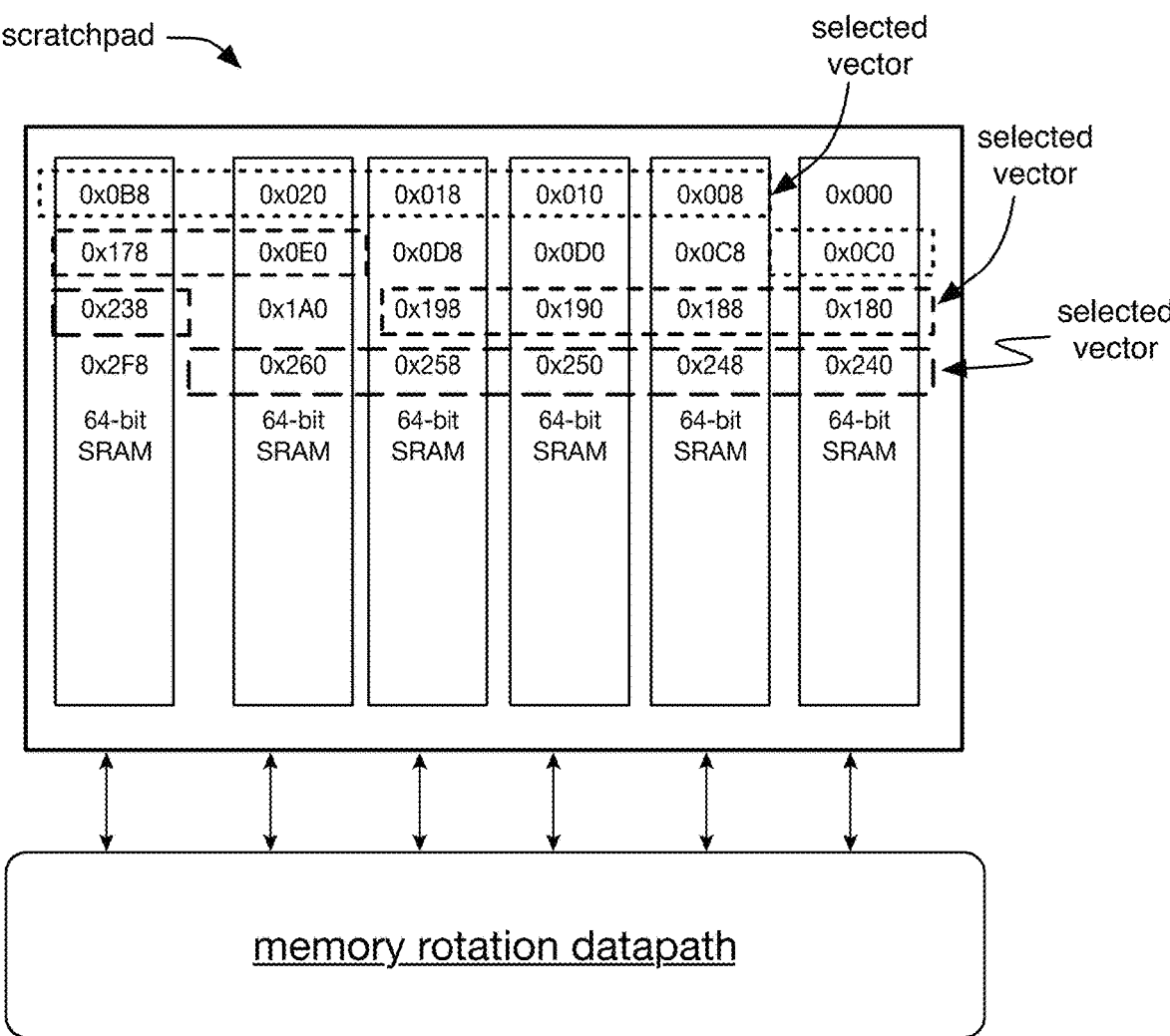

In a second example, in which the vector start address has a non-zero offset from the start of a scratchpad row, the read and/or write operations are performed on each lane from the start address through to the end of the row, then wrap around to the following scratchpad row for the remaining lanes (e.g., as shown by way of examples in FIGS. 5B-5C). The resulting data is preferably shifted by the offset amount (e.g., using the memory rotation datapath). A person of skill in the art will recognize that in ganged operation, the offset may specify the number of bits, bytes, lanes, or gangs of lanes to shift by, and/or may specify any other suitable offset value.

In one example, operating in the vectorized addressing mode can include receiving a vectorized addressing load instruction ("VLD") that specifies: one or more destinations to write data into (e.g., "$vdro", a pointer to a vector register specifying the destination(s) in memory), preferably a single vector destination for the entire vector to be read, but alternatively a separate scalar destination for each lane or gang to be read from; one or more values used to specify a location within the scratchpad to read from, such as specifying the byte address of the initial entry (or any other suitable entry, such as an entry at a predetermined index or predetermined address offset from the initial entry) of the vector to be read (e.g., "$scalar_addr", a pointer to a scalar register specifying a first address value, preferably in bytes, and/or "addr_offset", an immediate value specifying a second address value, preferably in bytes, wherein, in some specific examples, the initial entry address is specified as the sum of $scalar_addr and addr_offset); an address incrementing value, which can be used to update the location specified for either the present instruction or the subsequent vectorized addressing operation, such as by adding the address incrementing value to one of the values used to specify the location (e.g., "addr_update", an immediate value specifying an address offset, preferably in bytes, by which the value held at $scalar_addr is to be increased, such as to be increased either before or after the value held at $scalar_addr is retrieved for use in carrying out the present vectorized addressing operation); and/or a value used to indicate which lanes (or gangs of lanes) are to be used for the present instruction (e.g., "$scalar_mask", a pointer to a scalar register specifying a bitmask indicating which lanes are to be used). For example, an address ("addr", corresponding to the address of the initial entry of the vector specified by the instruction) can be calculated as addr=[($scalar_addr+ addr_offset)/LEN_BYTES]*LEN_BYTES (wherein [x] represents the floor of x), a scratchpad row index ("mem_ row") corresponding to the initial entry of the vector can be calculated as mem_row=[addr/VLEN_BYTES], and/or a scratchpad lane index ("initial_lane") corresponding to the initial entry of the vector (e.g., which can optionally be used to specify the number of lanes by which to rotate at the memory rotation datapath, rotating right for a load operation or rotating left for a store operation), typically corresponding to the lane index of the initial entry of the vector (and/or which can be used to specify a barrel shift), can be calculated as initial_lane=(addr»s) mod k, where LEN_BYTES is the integer size in the current mode, VLEN_BYTES is equal to the total number of bytes in a row of the scratchpad, k is the number of memory lanes in the scratchpad, s is the base-2 logarithm of the number of bytes in a single entry of the memory lane (wherein each memory lane of the scratchpad defines an identical bit width $b=2^{s+3}=8*2^s$, which is the number of bits in a single entry of the memory lane, and so $2\$$ is equal to the number of bytes in a single entry of the memory lane), wherein s is preferably a non-negative integer (e.g., a positive integer), and»is the right shift operator. In some examples, addr_update will be set equal to VLEN_BYTES (or alternatively, to a multiple thereof, or to any other suitable value), such repeating the same vectorized access instruction (e.g., without any change to its arguments) can function to iterate through adjacent vectors (and/or vectors having any other suitable relationship).

Additionally or alternatively, operating in the vectorized addressing mode can include receiving a vectorized addressing store instruction ("VST") that specifies: one or more sources to read data from (e.g., "$vsto", a pointer to a vector register specifying the source(s) in memory), preferably a single vector source for the entire vector to be written, but alternatively a separate scalar source for each lane or gang to be written to; one or more values used to specify a location within the scratchpad to write to, such as specifying the byte address of the initial entry (or any other suitable entry, such as an entry at a predetermined index or prede- termined address offset from the initial entry) of the vector location to be written to (e.g., "$scalar_addr", a pointer to a scalar register specifying a first address value, preferably in bytes, and/or "addr_offset", an immediate value specifying a second address value, preferably in bytes, wherein, in some specific examples, the initial entry address is specified as the sum of $scalar_addr and addr_offset); an address incrementing value (e.g., as described above regarding the address incrementing value of VLD); and/or a value used to indicate which lanes (or gangs of lanes) are to be used for the present instruction (e.g., as described above regarding the $scalar_mask of VLD). For example, an address, scratchpad row index, and/or scratchpad lane index corresponding to the initial entry of the vector can be determined based on the instruction (e.g., in an analogous manner to that described above regarding VLD, such as regarding calculating addr, mem_row, and/or initial_lane), wherein the scratchpad lane index corresponding to the initial entry can optionally be used to specify the number of lanes by which to rotate at the memory rotation datapath, rotating left for a store operation.

In a first example (e.g., as shown in FIG. 5B), a vectorized addressing load instruction specifies a destination $vdro to write to and a scratchpad address indicating the position of the initial entry of the vector to be read. In this example, the specified scratchpad address (in bytes) is 0x8, the system is operating in a 64-bit integer size mode, and the scratchpad includes X memory lanes (e.g., 24 memory lanes), meaning $scalar_addr+addr_offset=0x8, LEN_BYTES=8, VLEN_BYTES>8 (e.g., VLEN_BYTES=192), s=3, and k=X. Accordingly, addr=[0x8/8]*8=0x8, mem_row=[0x8/ VLEN_BYTES]=0, and initial_lane=(0x8»3) mod X=1 mod X=1. Accordingly, the selected vector begins with the ele- ment at scratchpad address 0x8, corresponding to row 0, lane 1, includes row 0 of all subsequent lanes (to the final lane, lane X-1), and wraps around to include row 1 of the remaining lane(s) (in this case, just lane 0). At the memory rotation datapath, the values are rotated right by 1 lane, such that the element at row 0, lane 1 is mapped to lane 0, the element at row 0, lane 2 is mapped to lane 1, and so on, with the element at row 1, lane 0 being mapped to the final lane (lane X-1). In a variation of this first example, a vectorized addressing store instruction specifies a source $vsro to read from and a scratchpad address indicating the position of the initial entry of the vector location to be written to, wherein the specified scratchpad address, integer size, and number of memory lanes are equivalent to those described above regarding this first example. In this variation, the selected vector location is as described above regarding this first example (regarding the selected vector to read), and at the memory rotation datapath, the values read from the source are rotated left by 1 lane, such that the value at lane 0 is mapped to row 0, lane 1, the value at lane 1 is mapped to row 0, lane 2, and so on, with the value at the final lane (lane X-1) being mapped to row 1, lane 0.

In a second example (e.g., as shown in FIG. 5C), the scratchpad can support vectorized addressing load instructions that specify a destination to write to and a scratchpad address indicating the position of the initial entry of the vector to be read (e.g., provided as a register pointer and an immediate value to be summed), and optionally specify an address incrementing value and/or a bitmask. Additionally or alternatively, the scratchpad can support vectorized addressing store instructions that specify a source to read from and a scratchpad address indicating the position of the initial entry of the vector location to be written to (e.g., provided as a register pointer and an immediate value to be summed), and optionally specify an address incrementing value and/or a bitmask. The scratchpad can include any suitable number of memory lanes. For example, the scratchpad can include 24 separate 64-bit lanes (e.g., as shown in FIG. 5C), wherein VLEN_BYTES=192.

In a first specific example (e.g., as depicted by the top-most "selected vector" of FIG. 5C), while the system is operating in a 64-bit integer mode, a vectorized addressing load instruction (or analogously, a vectorized addressing store instruction) specifying scratchpad address 0x008 is received (e.g., along with a bitmask of 0xFFFFFF=0b111111111111111111111111, indicating that all 24 lanes should be active). Accordingly, addr=[0x8/8] *8=0x8, mem_row=[0x8/192]=0, and initial_lane=(0x8»3) mod 24=1 mod 24=1. This address corresponds to row 0, lane 1, and so the selected vector has 23 entries in row 0 for lanes 1-23, has one entry in row 1 for lane 0, and the memory rotation datapath is configured to perform a 1-lane barrel shift (e.g., 1-lane right rotation for a load instruction or 1-lane left rotation for a store instruction).

In a second specific example (e.g., as depicted by the middle "selected vector" of FIG. 5C), while the system is operating in a 256-bit integer mode (e.g., wherein the scratchpad includes 6 gangs of lanes, corresponding to lanes 0-3, 4-7, 8-11, 12-15, 16-19, and 20-23, respectively), a vectorized addressing load instruction (or analogously, a vectorized addressing store instruction) specifying scratchpad address 0x0E8 is received (e.g., along with a bitmask of 0x3F=0b111111, indicating that all 6 gangs of lanes should be active). Accordingly, addr=[0xE8/32]*32=0xE0, mem_row=[0xE0/192]=1, and initial_lane=(0xE0»3) mod 24=28 mod 24=4. This address corresponds to row 1, lane 4, and so the selected vector has five entries in row 1 for lanes 4-23, has one entry in row 2 for lanes 0-3, and the memory rotation datapath is configured to perform a 4-lane barrel shift (e.g., 4-lane right rotation for a load instruction or 4-lane left rotation for a store instruction).

In a third specific example (e.g., as depicted by the bottom-most "selected vector" of FIG. 5C), while the system is operating in a 384-bit integer mode (e.g., wherein the scratchpad includes 4 gangs of lanes, corresponding to lanes 0-5, 6-11, 12-17, and 18-23, respectively), a vectorized addressing load instruction (or analogously, a vectorized addressing store instruction) specifying scratchpad address 0x01B0 is received (e.g., along with a bitmask of 0x3F=0b111111, indicating that all 4 gangs of lanes should be active, wherein the excess bits of the bitmask beyond the 4 LSBs are ignored; a bitmask of 0xF=0b1111 could alternatively be employed to identical effect). Accordingly, addr= [0x1B0/48]*48=0x1B0, mem_row=[0x1B0/192]=2, and initial_lane=(0x1B0»3) mod 24=54 mod 24=6. This address corresponds to row 2, lane 6, and so the selected vector has three entries in row 2 for lanes 6-23, has one entry in row 3 for lanes 0-5, and the memory rotation datapath is configured to perform a 6-lane barrel shift (e.g., 6-lane right rotation for a load instruction or 6-lane left rotation for a store instruction).

In some embodiments, operating in the vectorized addressing mode (and/or operating in the individual addressing mode) can include adjusting operation to accommodate differing integer sizes. For example, while operating in a larger integer size mode (e.g., 384-bit integer mode), it may be desirable to read from and/or write to one or more memory locations configured to store integers (e.g., 256-bit integers) of a smaller size than that of the current integer size mode, such as wherein the smaller-size integer is written to the least significant bits (and/or any other suitable bits) of the corresponding larger-size integer scratchpad entry (e.g., wherein the remaining bits of the scratchpad, such as the most significant bits, are: pre-configured to be zero; zeroed during and/or after this write; ignored when read, such as by reading using a bitmask with zero value bits corresponding to these positions; and/or otherwise configured, used, and/or not used); in examples in which the size of the smaller-size integers is an integer multiple of the bitwidth of the scratchpad lanes, this is preferably performed by writing each integer to a row within a sufficient number of lanes of a gang to store that integer, preferably to the least significant lanes of that gang (e.g., while the corresponding row 0f the remaining lanes of the gang are zeroed, ignored, and/or handled in any other suitable manner). Such use of different integer sizes can, in examples, function to reduce storage and/or transmission requirements (e.g., wherein a certain number of integers stored in a smaller format, such as a 256-bit format, will require less storage space and/or transmission load than the same number of integers stored in a larger format, such as a 384-bit format with 128 bits of zero padding).

Figure 6:
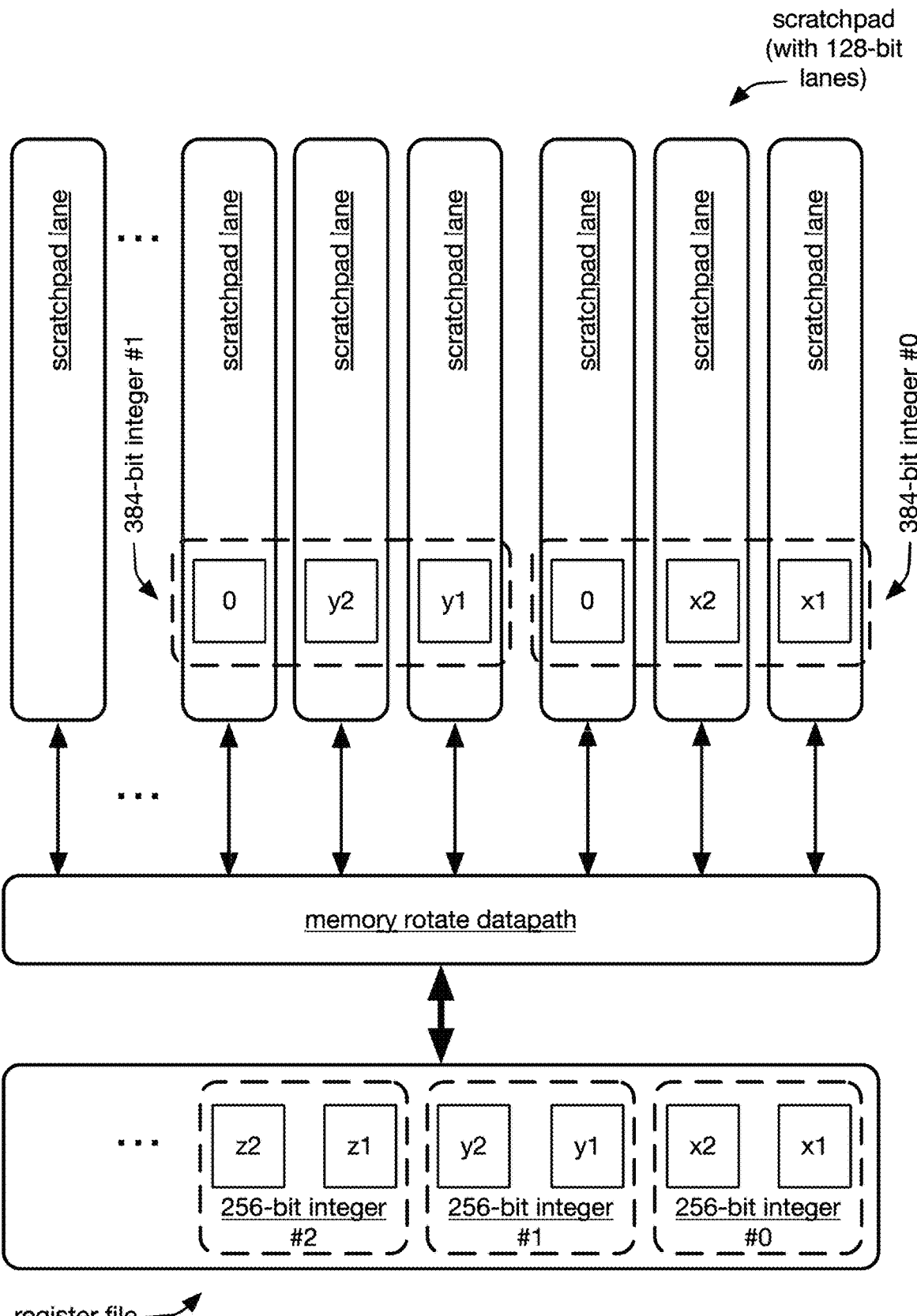
FIG. 6 is a schematic representation of an example of accommodating different integer sizes.

In one example (e.g., involving computations associated with elliptic curve operations using a 384-bit prime and a 256-bit scalar modulus), operating in the 384-bit integer mode can include reading 256-bit integers and loading them into 384-bit entries of a scratchpad vector (e.g., four 384-bit entries, in a specific example in which the scratchpad includes four 384-bit gangs of lanes); in this example, each 256-bit integer is preferably retrieved and written to the least significant bits (and/or any other suitable bits) of the corresponding 384-bit scratchpad entry (e.g., wherein the remaining bits of the scratchpad, such as the 128 most significant bits, are: pre-configured to be zero; zeroed during and/or after this write; ignored when read, such as by reading using a bitmask with zero value bits corresponding to these positions; and/or otherwise configured, used, and/or not used); for 64-bit scratchpad lanes forming 6-lane 384-bit gangs, this preferably corresponds to writing each 256-bit integer to a row within four of the lanes of a gang, preferably the least significant lanes of the gang (e.g., while the corresponding row 0f the remaining two lanes of the gang are zeroed, ignored, and/or handled in any other suitable manner). Analogously, the least significant bits (and/or any other suitable bits) of each entry of the scratchpad can be retrieved and stored in memory as smaller-size integers (e.g., retrieving the 256 LSBs of each 384-bit scratchpad entry of a vector, and storing each 256-bit value so retrieved in a different 256-bit integer elsewhere in memory). In a variation of this example, the scratchpad includes 128-bit lanes (and so each 384-bit entry is stored in a gang of three lanes), such as shown by way of example in FIG. 6.

However, the vectorized addressing mode can additionally or alternatively be operated in any other suitable manner. Further, the method can additionally or alternatively include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method of operation for a computing system, the method comprising, while operating the computing system in a first mode associated with a first mode word length, the first mode word length equal to W bits:

receiving a vector request indicative of a memory address A, expressed in bytes, within a scratchpad of the computing system, wherein:

the scratchpad comprises a scratchpad memory;
the scratchpad memory defines a plurality of memory rows that partition the scratchpad memory;

each memory row 0f the plurality has a memory capacity, expressed in bytes, of $N=KW/8$ for a positive integer K, wherein N has a prime factor greater than 2; and each memory row 0f the plurality stores a respective set of K words, wherein each word of the respective set has a bit width of W;

based on the memory address:

determining an initial memory row 0f the scratchpad memory by performing an integer division $Q=A/N$, wherein the initial memory row has an index of Q;

determining an initial word position within the initial memory row; and selecting a vector of K contiguous word positions from the scratchpad memory, the vector comprising:

the initial word position; and at least one word position located in a subsequent memory row 0f the scratchpad memory, the subsequent memory row having an index of $Q+1$; and based on the vector request and the vector, performing a memory operation between the scratchpad memory and a register file of the computing system, the register file communicatively coupled to the scratchpad, wherein performing the memory operation comprises at least one of:

reading the vector from the scratchpad memory; or writing to the vector within the scratchpad memory.

2. The method of claim 1, further comprising, while operating the computing system in a second mode associated with a second mode word length, the second mode word length equal to $W_2$ bits, wherein $N=K_2W_2/8$ for a second positive integer $K_2$:

receiving a second vector request indicative of a second memory address $A_2$, expressed in bytes, within the scratchpad, wherein each memory row 0f the plurality stores a respective set of $K_2$ words, wherein each word of the respective set has a bit width of $W_2$;

based on the second memory address:

determining a second initial memory row 0f the scratchpad memory by performing a second integer division $Q_2=A_2/N$, wherein the second initial memory row has an index of $Q_2$;

determining a second initial word position within the second initial memory row; and selecting a second vector of $K_2$ contiguous word positions from the scratchpad memory, the second vector comprising:

the second initial word position; and at least one word position located in a second subsequent memory row 0f the scratchpad memory, the second subsequent memory row having an index of $Q_2+1$; and based on the second vector request and the second vector, performing a second memory operation between the scratchpad memory and the register file, wherein performing the second memory operation comprises at least one of:

reading the second vector from the scratchpad memory; or writing to the second vector within the scratchpad memory.

3. The method of claim 2, wherein:

W has a prime factor of 3;

K does not have a prime factor of 3;

$W_2$ does not have a prime factor of 3;

$K_2$ has a prime factor of 3;

W is not divisible by $W_2$; and $W_2$ is not divisible by W.

4. The method of claim 1, wherein the prime factor is 3.

5. The method of claim 1, wherein the first mode word length is 384 bits.

6. The method of claim 1, further comprising, while operating the computing system in the first mode:

receiving a second vector request indicative of a second memory address $A_2$, expressed in bytes, within the scratchpad;

based on the second memory address:

determining a second initial memory row 0f the scratchpad memory by performing a second integer division $Q_2=A_2/N$, wherein the second initial memory row has an index of $Q_2$;

determining a second initial word position within the second initial memory row, wherein:

the initial word position is represented by a first offset from a beginning of the initial memory row;

the second initial word position is represented by a second offset from a beginning of the second initial memory row; and the first offset is different from the second offset; and selecting a second vector of $K_2$ contiguous word positions from the scratchpad memory, the second vector comprising the second initial word position; and based on the second vector request and the second vector, performing a second memory operation between the scratchpad memory and the register file, wherein performing the second memory operation comprises at least one of:

reading the second vector from the scratchpad memory; or writing to the second vector within the scratchpad memory.

7. The method of claim 6, wherein:

Q is not equal to $Q_2$;

the second offset is non-zero; and the second vector further comprises at least one word position located in a second subsequent memory row 0f the scratchpad memory, the second subsequent memory row having an index of $Q_2+1$.

8. The method of claim 7, wherein:

the register file is communicatively coupled to the scratchpad memory via a memory rotation datapath;

performing the memory operation comprises, at the memory rotation datapath, barrel shifting the vector based on the first offset; and performing the second memory operation comprises, at the memory rotation datapath, barrel shifting the second vector based on the second offset.

9. The method of claim 1, wherein:

the scratchpad defines a plurality of memory lanes that partition the scratchpad memory;

the plurality of memory lanes consists of k memory lanes;

each memory lane of the scratchpad defines an identical bit width $b=2^{s+3}$, wherein s is a positive integer; and determining the initial word position comprises determining the value $(A \gg s)$ mod k, where $\gg$ is the right shift operator, by:

generating an intermediary result by performing an s-bit right shift on A; and performing a modulo operation with modulus k on the intermediary result, wherein k has a prime factor greater than 2.

10. The method of claim 1, further comprising, while operating the computing system in the first mode:

receiving an element-wise request indicative of a plurality of memory addresses;

determining a set of element positions, comprising, for each memory address of the plurality, based on the memory address, determining a respective element position within the scratchpad memory, determining the respective element position comprising:

determining a respective memory row 0f the scratchpad memory by performing an integer division of the memory address divided by N; and determining a respective word position within the respective memory row; and based on the element-wise request and the set of element positions, performing a second memory operation between the scratchpad memory and the register file, wherein performing the second memory operation comprises at least one of:

concurrently reading from each element position of the set; or concurrently writing to each element position of the set;

wherein, for each element position of the set, the respective word position differs from the word position of all other element positions of the set.

\* \* \* \* \*